US009544959B2

(12) United States Patent
 Hsia (10) Patent No.: US 9,544,959 B2
(45) Date of Patent: *Jan. 10, 2017

(54) SOLID-STATE LIGHTING COMPATIBLE WITH BALLASTS AND OPERABLE WITH AC MAINS

(71) Applicant: Lightel Technologies, Inc., Renton, WA (US)

(72) Inventor: Chungho Hsia, Bellevue, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,363

(22) Filed: Feb. 22, 2016

(65) Prior Publication Data

US 2016/0174311 A1   Jun. 16, 2016

Related U.S. Application Data

(63) Continuation-in-part of application No. 14/688,841, filed on Apr. 16, 2015, now Pat. No. 9,288,867, which
(Continued)

(51) Int. Cl.
| | |
|---|---|
| *H05B 33/08* | (2006.01) |
| *F21V 23/06* | (2006.01) |
| *F21K 99/00* | (2016.01) |
| *F21V 25/04* | (2006.01) |
| *H02M 1/32* | (2007.01) |
| *H02M 1/00* | (2006.01) |
| *F21Y 101/00* | (2016.01) |

(52) U.S. Cl.
CPC ............. *H05B 33/0815* (2013.01); *F21K 9/27* (2016.08); *F21V 25/04* (2013.01); *H02M 1/32* (2013.01); *H05B 33/0803* (2013.01); *H05B 33/0806* (2013.01); *H05B 33/0845* (2013.01); *H05B 33/0884* (2013.01); *F21V 23/06* (2013.01); *F21Y 2101/00* (2013.01); *H02M 2001/0058* (2013.01); *Y02B 20/341* (2013.01); *Y02B 20/347* (2013.01); *Y02B 70/1491* (2013.01)

(58) Field of Classification Search
None
See application file for complete search history.

(56) References Cited

U.S. PATENT DOCUMENTS

| | | | | |
|---|---|---|---|---|
| 9,288,867 | B2 * | 3/2016 | Hsia ................... | H05B 33/0884 |
| 2010/0283391 | A1 * | 11/2010 | Braunshtein ....... | H05B 37/0263 |
| | | | | 315/127 |

(Continued)

*Primary Examiner* — Douglas W Owens
*Assistant Examiner* — James H Cho
(74) *Attorney, Agent, or Firm* — Han IP Corporation (57) ABSTRACT

A light-emitting diode (LED)-based solid-state universal lamp using a ballast compatible and AC-mains operable (BA) LED driving circuit with a power factor correction (PFC) and control device operates normally for a regulated power and current from either ballast or AC mains. The BA LED driving circuit is configured to operate in a wide range of input voltages and frequencies, especially for various high voltages and high frequencies associated with various ballasts. With a cycle-by-cycle current control and power switching at a constant on-time and varied off-time, an over-rated surge current is limited, preventing occasional fire hazards occurred in the ballast.

10 Claims, 7 Drawing Sheets

Related U.S. Application Data is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/535,249, filed on Jun. 27, 2012, now abandoned.

(56) References Cited

U.S. PATENT DOCUMENTS

| | | | |
|---|---|---|---|
| 2011/0285301 A1* | 11/2011 | Kuang | H05B 33/0845 315/200 R |
| 2011/0292704 A1* | 12/2011 | Makino | H02M 1/4208 363/126 |

* cited by examiner

SOLID-STATE LIGHTING COMPATIBLE WITH BALLASTS AND OPERABLE WITH AC MAINS

CROSS-REFERENCE TO RELATED APPLICATIONS

The present disclosure is a continuation-in-part (CIP) application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. The above-identified applications are incorporated herein by reference in their entirety.

BACKGROUND

Technical Field

The present disclosure relates to light-emitting diode (LED) lamps that work with conventional fluorescent lamp fixtures configured to electrically connect either ballasts or AC mains.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit application of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, a ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effectively solution by using a universal LED lamp that can be used with the AC mains and is compatible with a ballast so that LED lamp users can save an initial cost by changeover to such a universal LED lamp followed by retrofitting the lamp fixture to be used with the AC mains when the ballast dies.

Ballasts have several different types. However in the US, electronic ballasts are most popular in lamp fixtures because they are more efficient and less expensive than other types of ballasts. Nevertheless, it is better for the ballast-compatible LED lamp to be compatible with either electronic ballasts or other types of ballasts.

As mentioned above, a cost-effective solution may be to use a ballast as part of an LED driver to operate a lamp. In some prior art schemes, a switching mode power supply (SMPS) type LED driver is proposed to use with a ballast, but has not been completely accepted due to occasional fires that arise inside the ballast. The cause of these fires has been identified to be a large dc input capacitor in the SMPS type LED driver, which may destroy a capacitor in the ballast due to excessive initial resonant voltage. A conventional SMPS type LED driver for AC mains comprises a Buck converter, which can efficiently convert input voltages of 110~277 VAC into a DC voltage required to power LEDs in an LED lamp. However, the ballast has an output voltage much higher than 277 VAC with a frequency well above 60 Hz. Such a Buck converter is controlled by a control logic, which has several drawbacks that limit its use in ballast applications. First, the control logic has a low operating voltage range which inherently limits the wide range of input voltages that can be used. Second, an over-voltage protection (OVP) function in the control logic starts at a low voltage limited by the low operating voltage. When an input voltage from a ballast exceeds a certain value, OVP functions to stop operation, shutting down the lamp. Third, the Buck converter operates in a continuous conduction mode, in which an input current fails to follow the input voltage, leading to a low power factor with the AC mains and turn-on or other operational failures with the ballast. Fourth, the control logic is solely powered by a voltage built up by an input capacitor with a small capacitance to meet a short start-up requirement. When the input voltage drops to the minimum operating voltage level, the control logic fails to operate and sends no signals to the switch, and the Buck converter stops to function until the input voltage level recovers, resulting in flickering. For an LED lamp operating solely with a ballast, the power and current control is basically via an impedance or output voltage control. In the former case, when input frequency changes, the impedance changes, altering an AC current to flow into the driving circuit. A ballast is, in practice, supposed to operate two or more lamps, and its output frequency of the ballast decreases as a load increases, meaning that the total power consumption does not linearly increase as the number of lamps used increases. In the worst case, an LED lamp that is designed for a group of three or four lamps in a fixture powered by a ballast may be burned out due to over-rated current flowing into the LED arrays in the lamp if only one of such a lamp is installed in the fixture. For the latter case, the output voltage control approach may work with an electronic ballast but cannot be used in AC mains. In general, conventional LED drivers fail to work with a ballast and to properly operate an LED lamp at a regulated power, resulting in unstable lighting output. It goes without saying that the same LED drivers can flawlessly operate an LED lamp with the AC mains.

SUMMARY

The present disclosure aims to provide a novel approach that can be adopted to operate the LED lamp with input voltages either from the AC mains or a ballast and with an LED current regulated in both cases.

A universal LED lamp may include a plurality of LED printed circuit boards (LED PCBs), a light emission portion comprising LED arrays disposed on the LED PCBs, a bridge rectifier having two inputs, and a ballast compatible and AC operable (BA) LED driving circuit is used to replace a fluorescent lamp in a retrofit or newly-made lamp fixture that could have an existing ballast or simply an AC mains-ready configuration. When such a universal LED lamp is installed in the fixture, the BA LED driving circuit can detect how high an input voltage and frequency and make proper and necessary management so that the universal LED lamp can operate with the existing ballast or simply with the AC mains without operational uncertainty.

The BA LED driving circuit may include an input filter, a power factor correction (PFC) and control device, a Buck converter in communicating with the PFC and control device, an output capacitor in parallel with a resistor connected to the Buck converter to build up an output voltage and to power the LED arrays, and a voltage feedback module extracting partial energy from the output voltage to sustain the PFC and control device. The Buck converter comprises a switch controlled by the PFC and control device, a current sensing resistor, a diode, and an inductor with its current charging and discharging controlled by the switch. The PFC and control device detects zero current in the inductor within an AC cycle of an input voltage generating a zero current detection signal and controls the switch on and off with a constant on-time and a varied off-time controlled by the zero current detection signal. By adapting switching frequencies for a high frequency associated with an electronic ballast and a low frequency associated with a magnetic ballast or the AC mains, the BA LED driving circuit can provide an accurate output LED current required to operate the LED arrays no matter what input voltage is high ballast output voltage or regular 110 or 277 VAC from the AC mains. Not like prior art schemes that use an AC impedance control in ballast compatible lamps, the BA LED driving circuit adopts a scheme using switching mode power supply with regulated output power and current in the ballast compatible lamps. The same switching mode power supply used in the BA LED driving circuit to work with the ballast can also apply to a LED lamp in operating with the AC mains.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
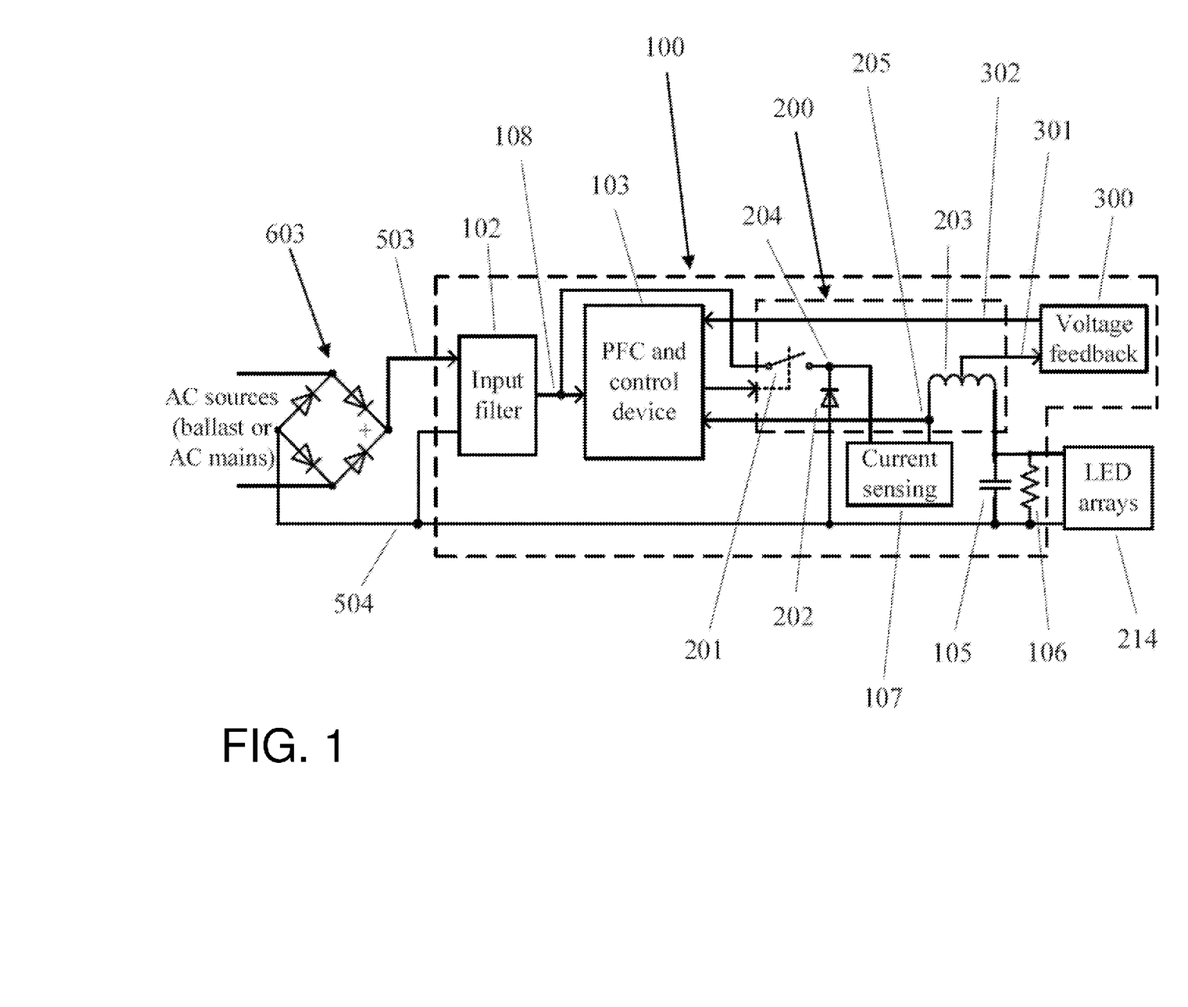
FIG. 1 is a block diagram of a BA LED driving circuit used in a universal LED lamp operable with either AC mains or a ballast according to the present disclosure.

FIG. 1 is a block diagram of a BA LED driving circuit used in a universal LED lamp operable with either AC mains or a ballast according to the present disclosure. A bridge rectifier 603 connecting to an AC source, either the AC mains or a ballast, converts alternating-current (AC) into direct-current (DC). The BA driving circuit 100 connecting to the bridge rectifier 603 comprises an input filter 102 used to filter the input voltage and to suppress EMI noise created in the BA driving circuit 100, a power factor correction (PFC) and control device 103, a Buck converter 200 in communicating with the PFC and control device 103, an output capacitor 105 in parallel with a resistor 106 connected to the Buck converter 200 to build up an output voltage and to power the LED arrays 214, a current sensing resistor 107, and a voltage feedback module 300 extracting partial energy from the output voltage to sustain the PFC and control device 103. The bridge rectifier 603 has four input/output ports, among which a high electric potential appears at the input/output port 503, and a low electric potential appears at the input/output port 504 respectively connecting to the high side and the low side of the input filter 102 with the low electric potential port 504 as a common ground. The Buck converter 200 comprises a switch 201 controlled by the PFC and control device 103, a diode 202, and an inductor 203 with its current charging and discharging controlled by the switch 201. The PFC and control device 103 detects zero current in the inductor 203 within an AC cycle of an input voltage generating a zero current detection signal and controls the switch 201 on and off with a constant on-time and a varied off-time controlled by the zero current detection signal. By adapting switching frequencies for a high frequency associated with a ballast and a low frequency associated with the AC mains, the PFC and control device 103 controls the switch 201 on and off in a way that the inductor 203 is charged during on-time and discharged during off-time, and that a desired output voltage $V_o$ across the LED arrays 214 is reached to light up the LED arrays 214. The average inductor current is thus equal to the output current that flows into the LED array 214. When the switch 201 is on, the diode 202 is reverse-biased, and an input current flows from an output port 108 in the input filter 102, the switch 201, the first port 204 of the current sensing resistor 107, the current sensing resistor 107 itself, and the second port 205 of the current sensing resistor 107, into the inductor 203. When the current flowing into the inductor 203 increases, the voltage across the current sensing resistor 107 increases. The second port 205 of the current sensing resistor 107 connects with the PFC and control device 103, which continuously receives signals and adjusts the off-time such that the output voltage and current to the LED arrays 214 are regulated to meet the output requirements. The output capacitor 105, in parallel with the resistor 106, connects to the inductor 203 and receives energy to build up an output voltage and to power the LED arrays 214.

The inductor 203 configured as an autotransformer has a center-tapped port connecting to the first port 301 of the voltage feedback module 300 comprising a diode. The voltage feedback module 300 has two connection ports 301 and 302, with the first connection port 301 connecting to the center-tapped port of center-tapped inductor 203 and with the second connection port 302 connecting to the PFC and control device 103. The PFC and control device 103 has an input capacitor (not shown) with a voltage built up to supply an internal logic control circuit (not shown) in the PFC and control device 103. When the voltage decreases due to its increased internal operations and controls, and when the voltage at the center-tapped port of the inductor 203 is higher than the supplying voltage, the diode in the voltage feedback module 300 conducts to supply a current to the PFC and control device 103 and sustain its operations. The function of the voltage feedback module 300 is essential because the BA LED driving circuit 100 has a wide range of operating voltages not only 110 and 277 VAC for AC mains but also 375~400 VAC for an electronic ballast. In the PFC and control device 103, a start-up resistor (not shown) is so designed to operate the universal LED lamp at the lowest input voltage 110 VAC. When the highest voltage 400 VAC from the electronic ballast comes in, a higher proportional voltage appears at an input of the internal logic control circuit. Therefore an operating voltage for the internal logic control circuit must be in a wide range such as 11~35 volts, direct current (VDC) rather than 5~15 VDC as in a conventional logic control device. To meet requirements of start-up time and current without turn-on failure or flickering occurred at the lamp start-up, the input capacitor in the PFC and control device 103 with a minimum capacitance is designed and used at the input of the internal logic control circuit. The voltage feedback module 300 is thus needed to pump in energy in time and to sustain the operating voltage and ensure no flickering occurred when operating the universal LED lamp.

When the switch 201 is off, the diode 202 is forward-biased, and the inductor 203 discharges with a loop current flowing from the LED arrays 214, the diode 202, the current sensing resistor 107, back to the inductor 203. The current sensing resistor 107 keeps track of the output current and feedbacks to the PFC and control device 103 to further control the switch 201 on and off. The closed loop operation in both on-time and off-time of the switch 201 ensures the output current to be accurately controlled within 4%.

Figure 2:
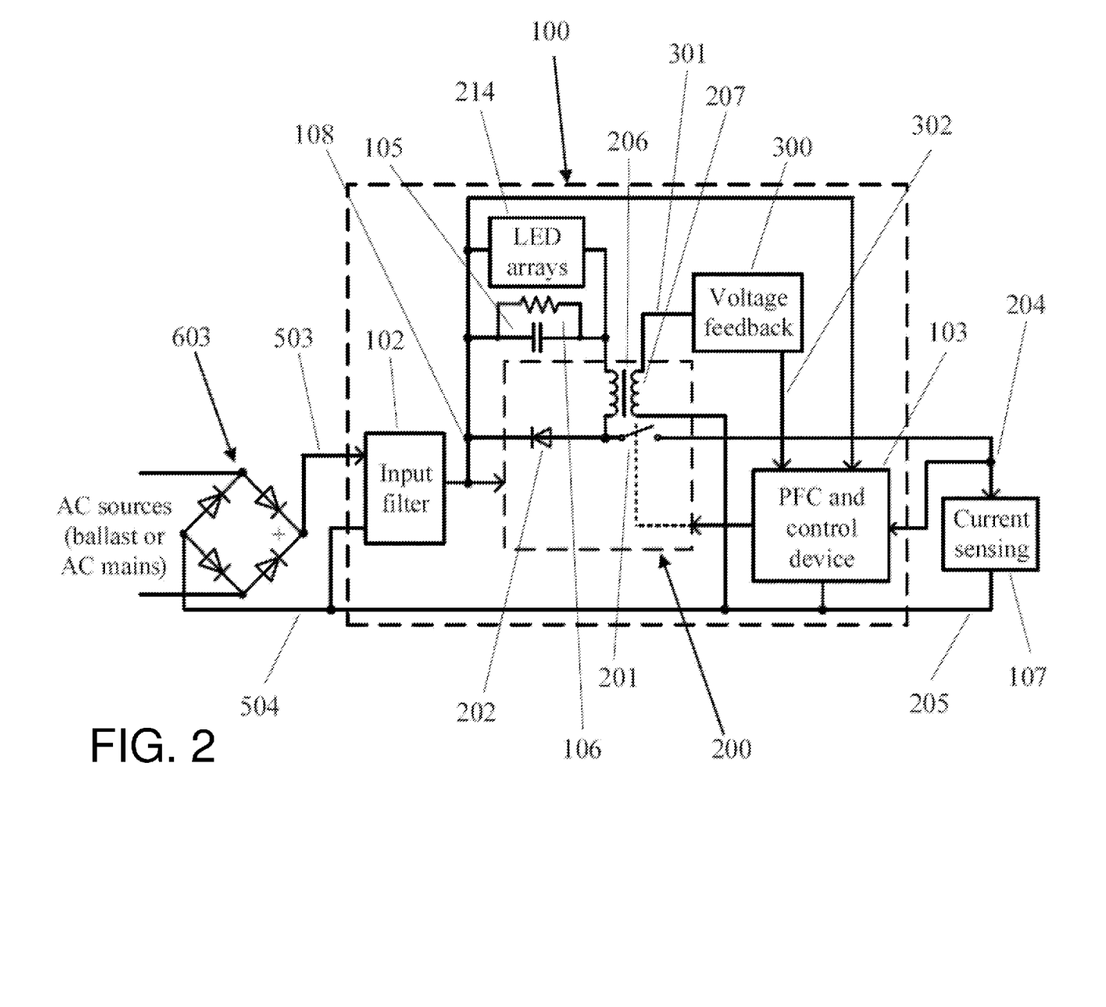
FIG. 2 is a block diagram of another embodiment of a BA LED driving circuit used in universal LED lamp operable with either AC mains or a ballast according to the present disclosure.

FIG. 2 is a block diagram of another embodiment of a BA LED driving circuit used in a universal LED lamp operable with either AC mains or an electronic ballast according to the present disclosure. FIG. 2 has all the components as in FIG. 1, except that interconnections are different, and a transformer 206 in FIG. 2 replaces the center-tapped inductor 203 in FIG. 1. In FIG. 2, the same numerals are used for the same components as in FIG. 1. In FIG. 2, when the power is on, an input current enters the input filter 102 and then the PFC and control device 103, turning on the switch 201. Whereas the diode 202 is reverse-biased, the input current goes from the resistor 106, a primary side of the transformer 206, the switch 201, and the current sensing resistor 107 to the common ground 504, completing an AC cycle. When the input current goes into the primary side of the transformer 206, energy is stored in it. The PFC and control device 103 detects the input voltage level and control the switch 201 on and off in a way that a desired output voltage $V_o$ across the LED arrays 214 is reached to light up the LED arrays 214. When the switch 201 is off, the diode 202 is forward-biased, and the primary side of the transformer 206 releases the energy stored, resulting in a loop current flowing from the diode 202 and the LED arrays 214, back to the primary side of the transformer 206, completing the energy transfer to the LED arrays 214. When the switch 201 is on, the input current flows into the LED arrays 214, the primary side of the transformer 206, the switch 201, and the current sensing resistor 107, creating a voltage drop across the current sensing resistor 107. The voltage appearing at the port 204 of the current sensing resistor 107 inputs to the PFC and control device 103 to control the off-time of the switch 201. The voltage feedback module 300 has two connection ports 301 and 302, with the first connection port 301 connecting to a high side of a secondary winding 207 in the transformer 206 and with the second connection port 302 connecting to the PFC and control device 103, as in FIG. 1. The voltage feedback module 300 continuously monitors the output voltage by using the secondary winding 207 in the transformer 206. When the voltage at the high side of the secondary winding 207 is higher than a becoming lower operating voltage in the PFC and control device 103 due to increased internal operations, the diode (not shown) in the voltage feedback module 300 conducts to supply energy in time through the second connection port 302 to sustain the operating voltage in the PFC and control device 103.

Figure 3:
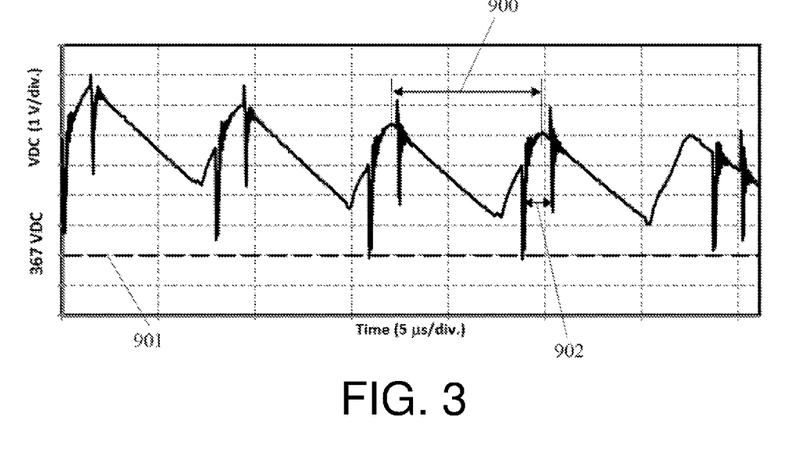
FIG. 3 is a waveform of DC voltage measured at output of a bridge rectifier used in a universal LED lamp powered by an electronic ballast according to the present disclosure.

FIG. 3 is a waveform of DC voltage measured at output of a bridge rectifier used in a universal LED lamp powered by an electronic ballast according to the embodiment in FIG. 1. When an electronic ballast connects to the universal LED lamp with power, it supplies a high voltage over 350 VAC and a frequency in a range of 40~64 KHz, depending on ballast designs. Referring to FIGS. 1 and 3, the bridge rectifier 603 is used to convert AC into DC to power the BA LED driving circuit 100. The bridge rectifier 603 connects to the input filter 102 used to filter out the input voltage and suppress EMI voltage generated in power switching in the BA LED driving circuit 100. In FIG. 3, the DC voltage is 370 V (rms) relative to a 367 VDC level at 901 with a ripple cycle 900 repeated every 7.8 μs showing a frequency of 128 KHz, twice the output frequency of the electronic ballast used. The glitches in the waveform show the EMI noise when the switch 201 is turned on and off with an on-time 903 of 1.5 μs, adapted in the PFC and control device 103. Such a short on-time is so chosen by the PFC and control device 103 because the ballast output voltage is high, and the energy the inductor is charged within the on-time is sufficiently enough to power the LED arrays 214 in each AC cycle.

Figure 4:
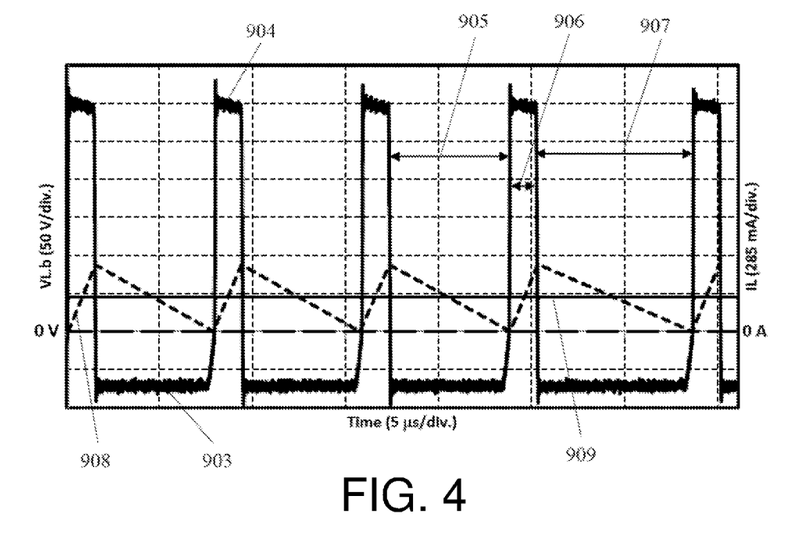
FIG. 4 is a waveform of a voltage measured across an inductor used in a BA LED driving circuit when an electronic ballast is used to operate a universal LED lamp according to the present disclosure.

FIG. 4 is a waveform of a voltage measured across an inductor used in a BA LED driving circuit when an electronic ballast is used to operate a universal LED lamp according to the present disclosure. Referring to FIGS. 1 and 4, the inductor 203 is charged when the switch 201 is on. The high level at 904 represents $V_{DC,b}-V_o$, where $V_{DC,b}$ is a voltage output from the switch 201 when the BA LED driving circuit is powered by the electronic ballast, and $V_o$ is a desired output voltage across the LED arrays 214. The $V_{DC,b}$ is over 370 V (rms). The low level at 903 represents $-V_o$. The voltage $V_{L,b}$ across the inductor 203 shows a series of pulses with a pulse width 906 of 1.5 μs, same as measured in FIG. 3, representing the on-time of the switch 201. The inductor 203 is discharged when the switch 201 is off. As seen in FIG. 4, an inductor current 908 increases linearly with the on-time from the zero current, reaching the maximum $I_{pk}$ at the end of the on-time, then starting to discharge from the maximum inductor current $I_{pk}$ during off-time. At the end of the discharging cycle, the inductor current decreases to zero, and the PFC and control device 103 detects the zero current and turns on the switch 201 for a next charging cycle. An average inductor current 909 then represents a desired output current to operate the LED arrays 241. For a $V_{DC,b}$ of 370 V rectified from an electronic ballast to going into the BA LED driving circuit 100, the on-time is fixed at 1.5 μs, whereas the off-time of the switch 201 varies as determined by the zero inductor current. In FIG. 4, two off-time periods 905 and 907, respectively representing 6.34 μs and 8.41 μs appear in the series of pulses. Thus the corresponding switching frequencies are 128 KHz and 101 KHz. This means that only one inductor charging cycle is available for each half cycle of the ballast AC input. The switching frequency of 128 KHz dominates in most cycles, which gives an output voltage $V_o$ based on a duty cycle of 0.191 with a constant output current $I_o$. Because the LED arrays 214 can clamp the output voltage to a stacked forward voltage determined by a plurality of LEDs connected in series, the constant (regulated) current gives a regulated power to operate the LED arrays 214 when the electronic ballast is used with the BA LED driving circuit 100.

Figure 5:
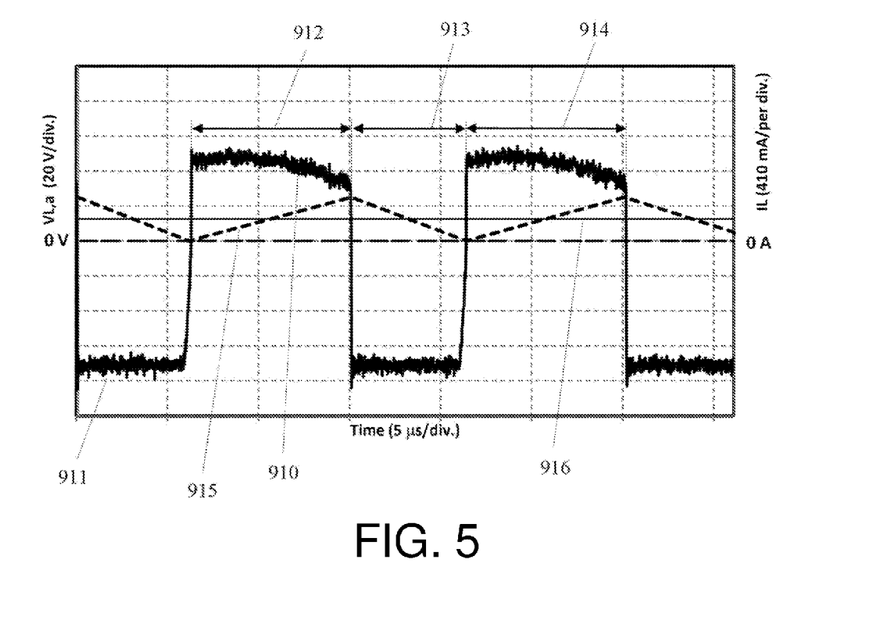
FIG. 5 is a waveform of a voltage measured across an inductor used in a BA LED driving circuit when a power from AC mains is used to operate a universal LED lamp according to the present disclosure.

Referring to FIG. 1, when 120 V/60 Hz of the AC mains is applied to the universal LED lamp, the bridge rectifier 603 outputs a DC voltage of 158 V (pk) with a ripple cycle of 8.33 ms equivalent to a frequency of 120 Hz, twice the frequency of the AC mains. FIG. 5 is a waveform of a voltage measured across an inductor used in a BA LED driving circuit 100 when a power from 120 V of AC mains is used to operate a universal LED lamp according to the present disclosure. Referring to FIGS. 1 and 5, the inductor 203 is charged when the switch 201 is on. The high level at 910 represents $V_{Dc,a}-V_o$, where $V_{DC,a}$ is a voltage output from the switch 201 when the BA LED driving circuit 100 is powered by 120 V AC mains, and $V_o$ is a desired voltage across the LED arrays 214. The low level 911 represents $-V_o$. The voltage $V_{L,a}$ function of time across the inductor 203 shows two pulses with both of their pulse widths 912 and 914 of 8.66 μs, representing the on-time of the switch 201 under 120 V AC mains input. The inductor 203 is discharged when the switch 201 is off. As seen in FIG. 5, an inductor current 915 increases linearly with the on-time from the zero current when charged, reaching the maximum $I_{pk}$ at the end of the on-time, then starting to discharge from the maximum inductor current $I_{pk}$ during off-time. At the end of discharge cycle, the inductor current decreases to zero, and the PFC and control device 103 detects the zero current and turns on the switch 201 for a next charging cycle. An average inductor current 916 then represents a desired output current to operate the LED arrays 241. For a $V_{DC}$ of 158 V rectified from the 120 V AC mains to going into the BA LED driving circuit 100, the on-time is fixed at 8.66 μs, whereas the off-time of the switch 201 varies as determined by the zero inductor current. In FIG. 5, the off-time period 913 of 6.22 μs appears in between the two pulses. Thus the corresponding switching frequency is 67 KHz. This means that hundreds of inductor charging cycles are used for each half cycle of the 120 V AC mains input. However, the switching frequencies vary from 55 KHz to 67 KHz for each half cycle of the 120 V AC mains input because $V_{DC,a}$ has a sinusoidal dependency, and the off-time varies accordingly. In FIG. 5, a duty cycle of 0.582 gives a desired output voltage $V_o$ with a constant output current, yielding a regulated power to operate the LED arrays 214 when the AC mains are used with the BA LED driving circuit 100. For a 277 VAC/60 Hz input, experimental results are similar to the ones depicted above for 110 VAC input with a switch on-time and off-time of 2 μs and 8~9.5 μs, respectively, which is equivalent to a switching frequency of 90~103 KHz.

Figure 6:
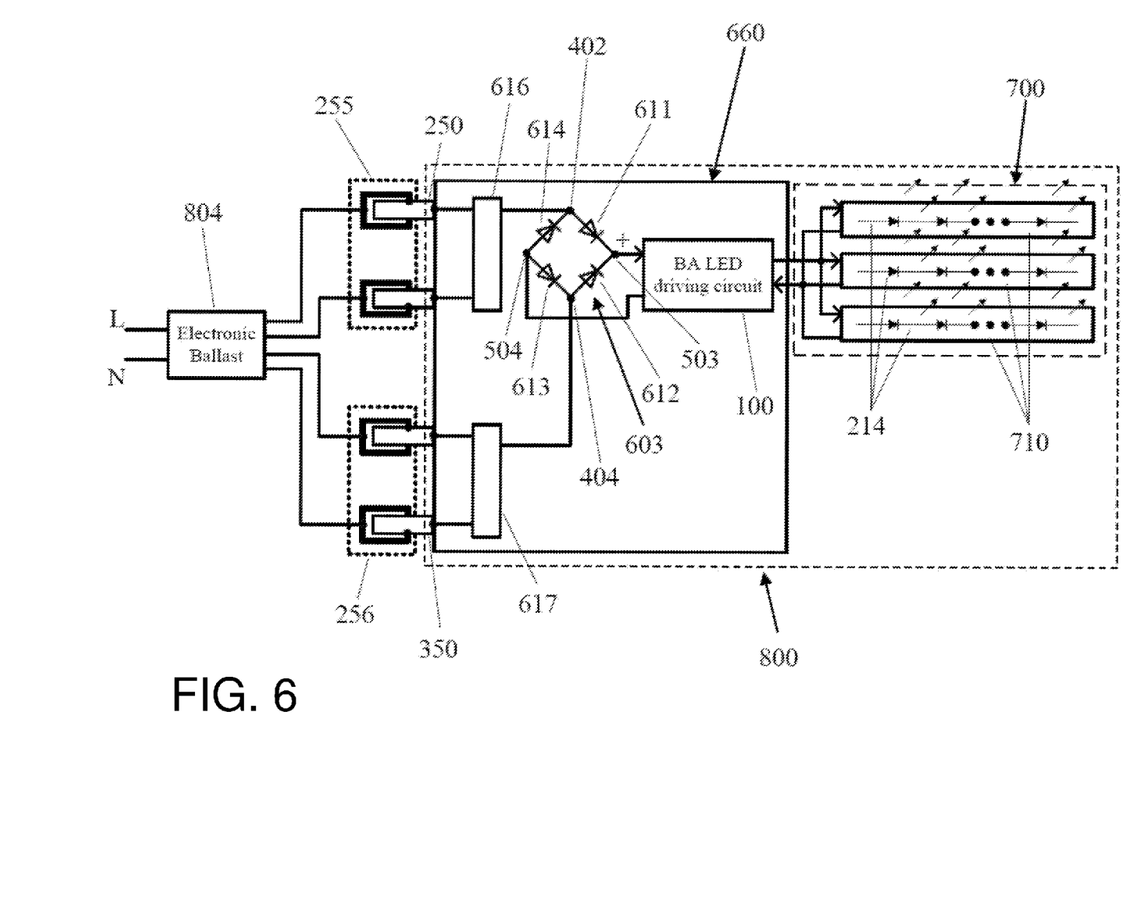
FIG. 6 is a block diagram of a universal LED lamp operable with an electronic ballast according to the present disclosure.

FIG. 6 is a block diagram of a universal LED lamp operable with an electronic ballast according to the present disclosure. The universal LED lamp 800 comprises a light emission portion 700; a lamp base 660 comprising electrical connection terminals with two pairs of bi-pins 250 and 350 protruding outwards; two filament circuits 616 and 617; a bridge rectifier 603 comprising four diodes 611, 612, 613, and 614 interconnected at four input/output ports 402, 404, 503, and 504; a BA LED driving circuit 100 having two inputs connected to the input/outputs 503 and 504; and LED arrays 214 on the LED PCBs 710 disposed in the light emission portion 700. Each of the filament circuits 616 and 617 comprising at least a resistor has three ports in which the first and the second ports connect to the two pins of the respective bi-pins 250 and 350, and the third port connects to the bridge rectifier 603 via the input/output ports 402 and 404. The bridge rectifier 603 thus can receive power from the electronic ballast in a lamp fixture through the bi-pins 250 and 350. In general, an electronic ballast has two pairs of wires connecting to a fluorescent fixture to operate a fluorescent lamp. In FIG. 6, the first and the second pairs of wires from the electronic ballast 804 respectively connect to two electrical sockets 255 and 256 in the lamp fixture. The two filament circuits 616 and 617 are used to mimic two filaments in a fluorescent lamp during a start up process to properly operate the fluorescent lamp. In some electronic ballasts, an internal circuit will check to see if such filaments exist to further proceed with a high voltage across the two pairs of the wires to operate the lamp. Each filament comprises at least one resistor with a resistance so small that its voltage drop and power consumption can be neglected. Receiving DC power from the bridge rectifier 603, the BA LED driving circuit 100 can thus operate the LED arrays 214 flicker-free on the LED PCBs 710 disposed in the light emission portion 700.

Figure 7:
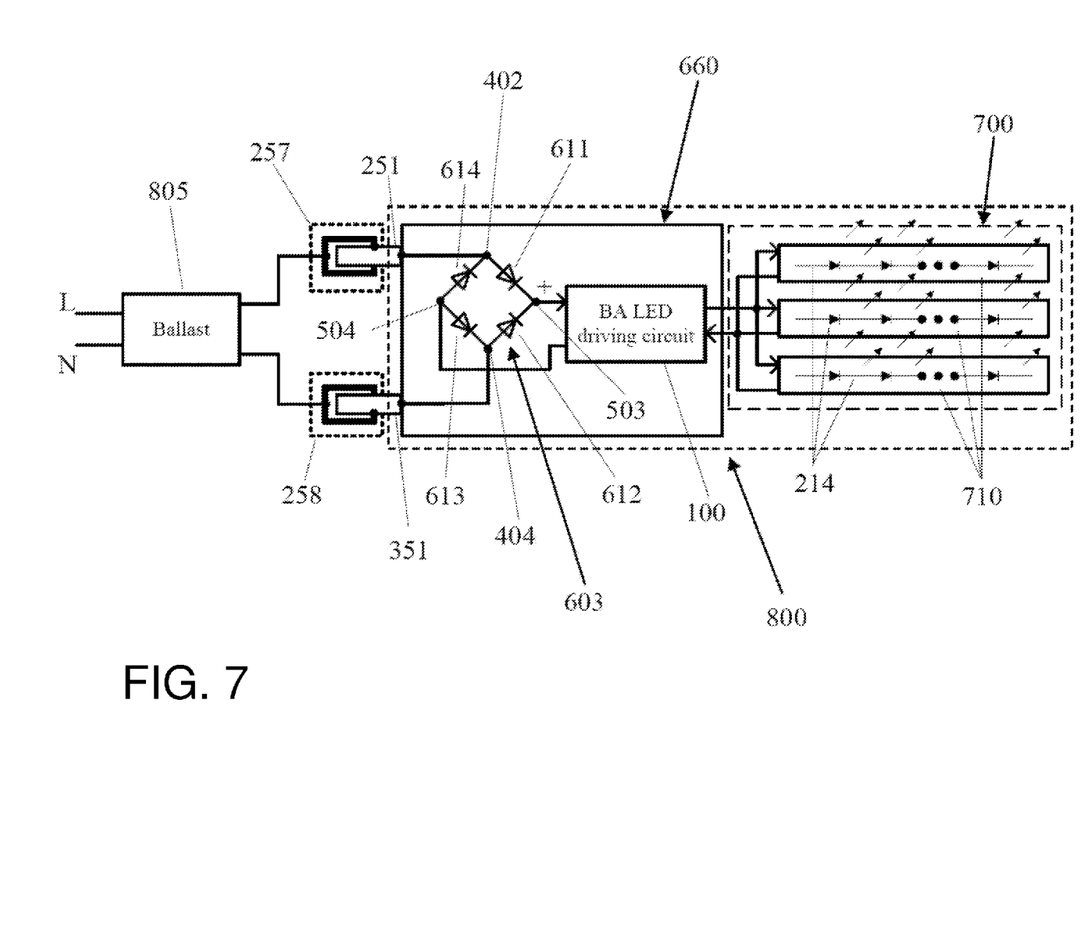
FIG. 7 is a block diagram of a universal LED lamp operable with a ballast which supports an output connection of two wires according to the present disclosure.

FIG. 7 is a block diagram of a universal LED lamp operable with a ballast that supports an output connection of two wires according to the present disclosure. In this case, the ballast has one pair of wires connecting to an original fluorescent fixture to operate the universal LED lamp. In FIG. 7, the first and the second wires from the ballast 805 respectively connect to two electrical sockets 257 and 258 in the fixture. The universal LED lamp is same as the one in FIG. 6 except that the electrical connection terminals comprise only two pins 251 and 351 connecting to the two electrical sockets 257 and 258 in the fixture and that there is no filament circuits. The ballast of this kind may be of a magnetic preheat type. Same as in FIG. 6, the BA LED driving circuit 100 supports this kind of ballast and thus can operate the LED arrays 214 flicker-free on the LED PCBs 710 in the light emission portion 700.

Figure 8:
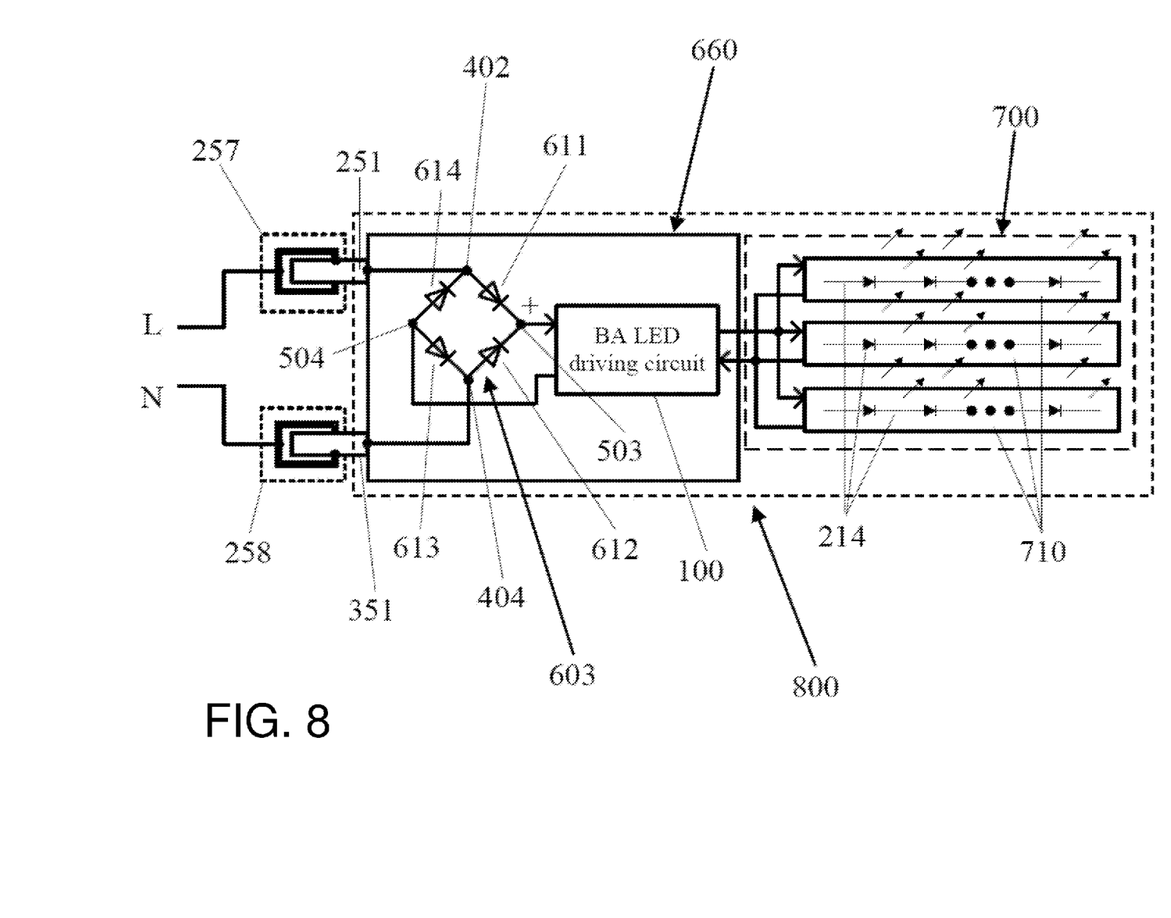
FIG. 8 is a block diagram of a universal LED lamp operable with AC mains according to the present disclosure.

FIG. 8 is a block diagram of a universal LED lamp operable with AC mains according to the present disclosure. In this case, the power from AC mains directly delivers to the universal LED lamp through the electrical connection terminals of the two pins 251 and 351. Same as in FIG. 7, the BA LED driving circuit 100 supports direct input of the power from the AC main and thus can operate the LED arrays 214 flicker-free on the LED PCBs 710 in the light emission portion 700.

In FIG. 6, although the universal LED lamp is shown to be installed in a fixture in which two pairs of the sockets are on the same side of the fixture, the universal LED lamp may fit in different sockets and thus may have different base types and shapes. Also although the universal LED lamp is shown to have two filament circuits, the universal LED lamp may not have filament circuits. Nevertheless, the universal LED lamps may come in a wide variety of shapes and rest n various electrical connection terminals with base types fixed with either two or four pins used in compact fluorescent lamps (CFLs) and compact fluorescent bulbs, two bi-pins used in G13 fluorescent tubes, or other E-base types used in other fluorescent lamps. Base types for two pin plug-in CFLs comprise G23, GX23, and G24d. For 4 pin plug-in CFLs, bases comprise G24q, Gx24q, and 2G11. Base types for compact fluorescent bulbs comprise two-pin GU24, GU10 and GU5.3. The E-base types comprise E26, E27, or E39.

Although the above embodiments use an LED lamp as an example, in fact, all the conventional fluorescent lamps used today can be replaced with the universal LED lamps adopting the BA LED driving circuit, featuring as ballast compatible and AC main-operable.

Whereas preferred embodiments of the present disclosure have been shown and described, it will be realized that alterations, modifications, and improvements may be made thereto without departing from the scope of the following claims. Another BA LED driving circuit with a voltage feedback module in an LED lamp using various kinds of combinations to accomplish the same or different objectives could be easily adapted for use from the present disclosure.

Accordingly, the foregoing descriptions and attached drawings are by way of example only, and are not intended to be limiting.

What is claimed is:

1. A light-emitting diode (LED) lamp, comprising:
a plurality of LED printed circuit boards (LED PCBs);
a light emission portion comprising LED arrays disposed on the plurality of LED PCBs;
a lamp base portion connected to the light emission portion, the lamp base portion comprising electrical connection terminals;
a bridge rectifier connected to the electrical connection terminals, the bridge rectifier configured to convert an alternating-current (AC) input voltage into a direct-current (DC) voltage; and
an LED driving circuit coupled to receive the DC voltage from the bridge rectifier, the LED driving circuit comprising an input filter, a power factor correction (PFC) and control device, a switch controlled by the PFC and control device, a current sensing resistor, a diode, an inductor with its current charging and discharging controlled by the switch, a resistor, an output capacitor in parallel with the resistor and connected to the inductor to build up an output voltage and to power the LED arrays, and a voltage feedback module configured to draw a partial power from the output voltage to sustain an operation of the PFC and control device,
wherein, responsive to detecting a zero current in the inductor within an AC cycle of the AC input voltage, the PFC and control device generates a zero current detection signal to turn the switch on and off with a constant on-time and a varied off-time.

2. The LED lamp of claim 1, wherein the voltage feedback module comprises a diode.

3. The LED lamp of claim 1, wherein the inductor in the LED driving circuit is of an autotransformer type.

4. The LED lamp of claim 1, wherein the inductor in the LED driving circuit is of a transformer type.

5. The LED lamp of claim 1, wherein the PFC and control device operates in a range approximately between 11 volts, direct current (VDC) and 35 VDC.

6. The LED lamp of claim 1, wherein the electrical connection terminals comprise four pins comprising a base of G24q, Gx24q, or 2G11.

7. The LED lamp of claim 1, wherein the electrical connection terminals comprise two pins comprising a base of G23, GX23, or G24d.

8. The LED lamp of claim 1, wherein the electrical connection terminals comprise two pins comprising a base of GU24, GU10, or GU5.3.

9. The LED lamp of claim 1, wherein the electrical connection terminals comprise a base of E26, E27, or E39.

10. The LED lamp of claim 1, wherein the electrical connection terminals comprise a base of G13.

* * * * *